Sept. 14, 1937.  B. KLEIN  2,092,761
SOUND REPRODUCING AND DISPLAY APPARATUS
Filed Nov. 7, 1935  5 Sheets-Sheet 1
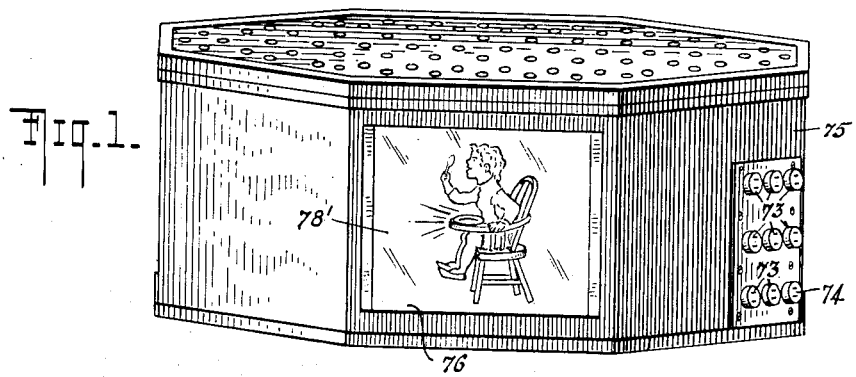
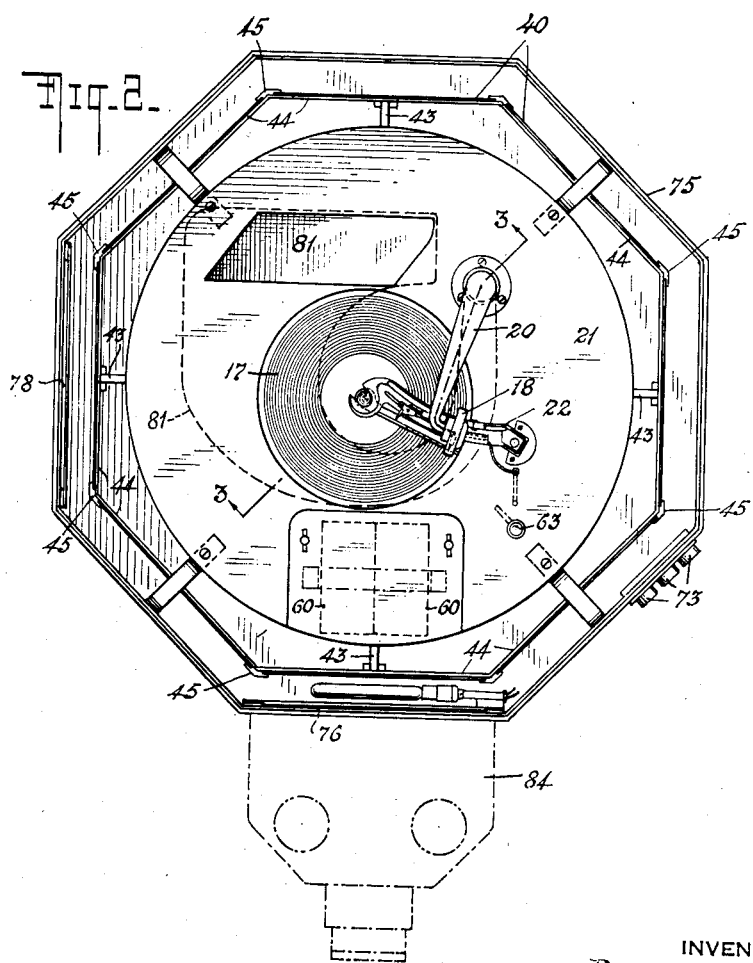
INVENTOR
BENJAMIN KLEIN
BY
ATTORNEY

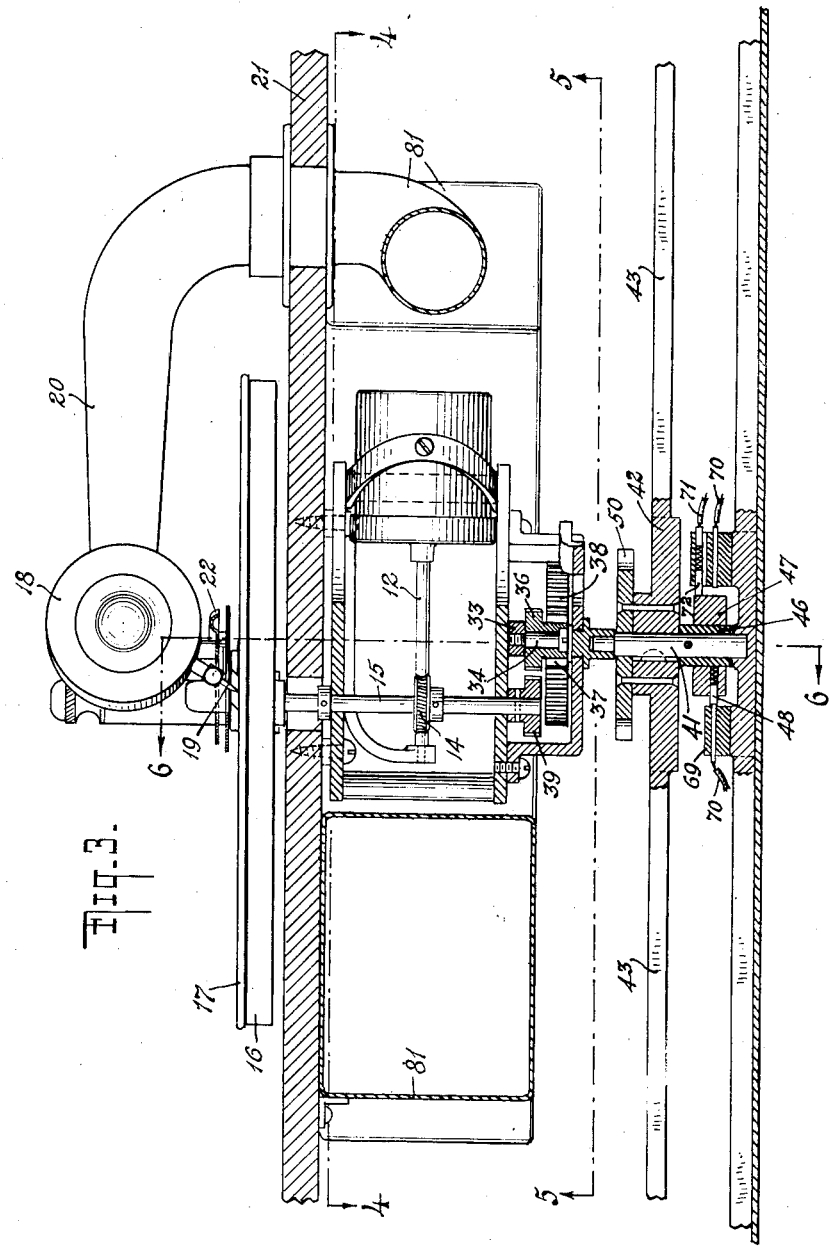

Sept. 14, 1937.   B. KLEIN   2,092,761
SOUND REPRODUCING AND DISPLAY APPARATUS
Filed Nov. 7, 1935   5 Sheets-Sheet 3

INVENTOR
BENJAMIN KLEIN
BY
ATTORNEY

Sept. 14, 1937.  B. KLEIN  2,092,761
SOUND REPRODUCING AND DISPLAY APPARATUS
Filed Nov. 7, 1935  5 Sheets-Sheet 4
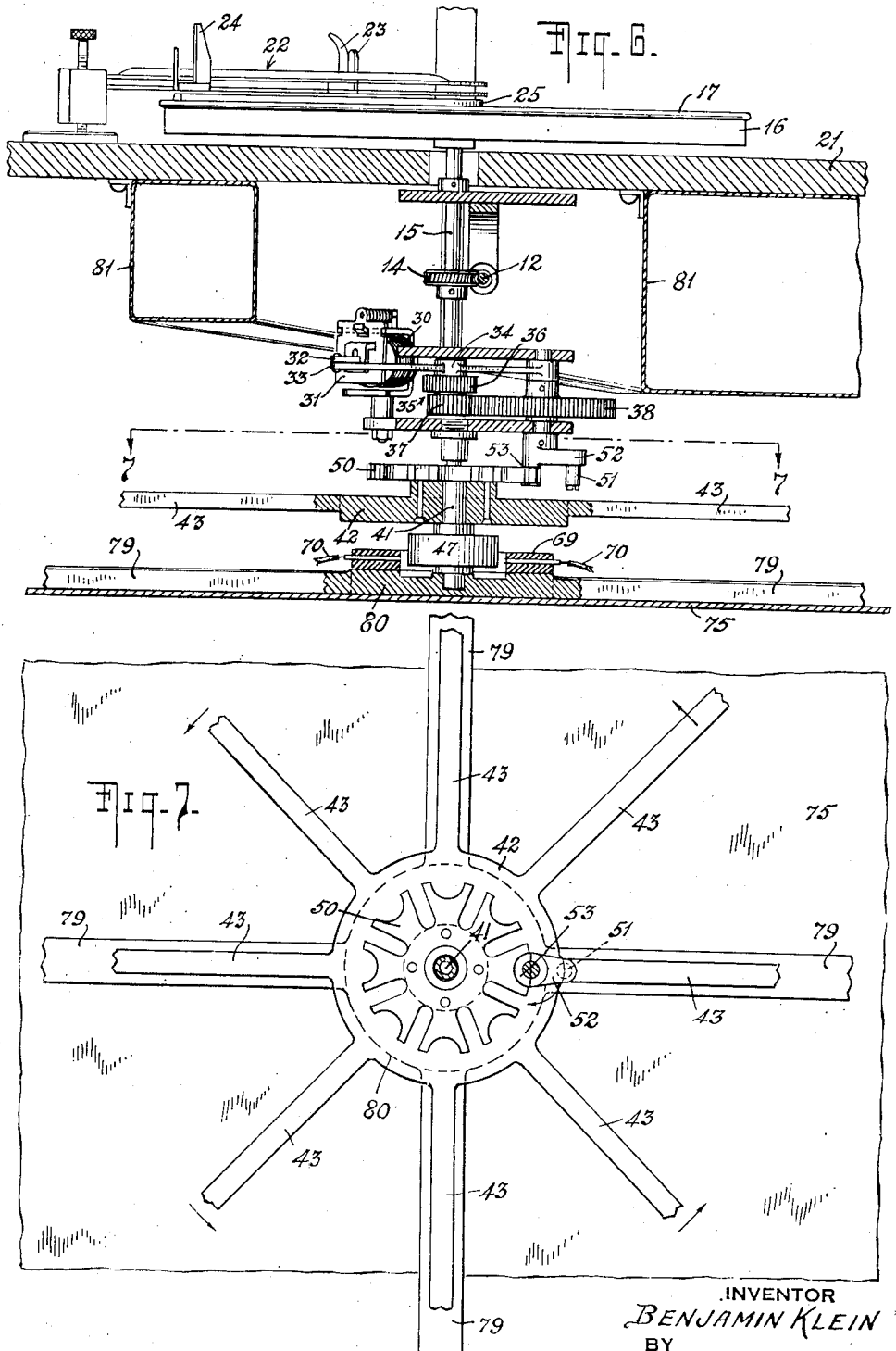
INVENTOR
BENJAMIN KLEIN
BY
ATTORNEY Sept. 14, 1937. B. KLEIN 2,092,761
SOUND REPRODUCING AND DISPLAY APPARATUS
Filed Nov. 7, 1935 5 Sheets-Sheet 5
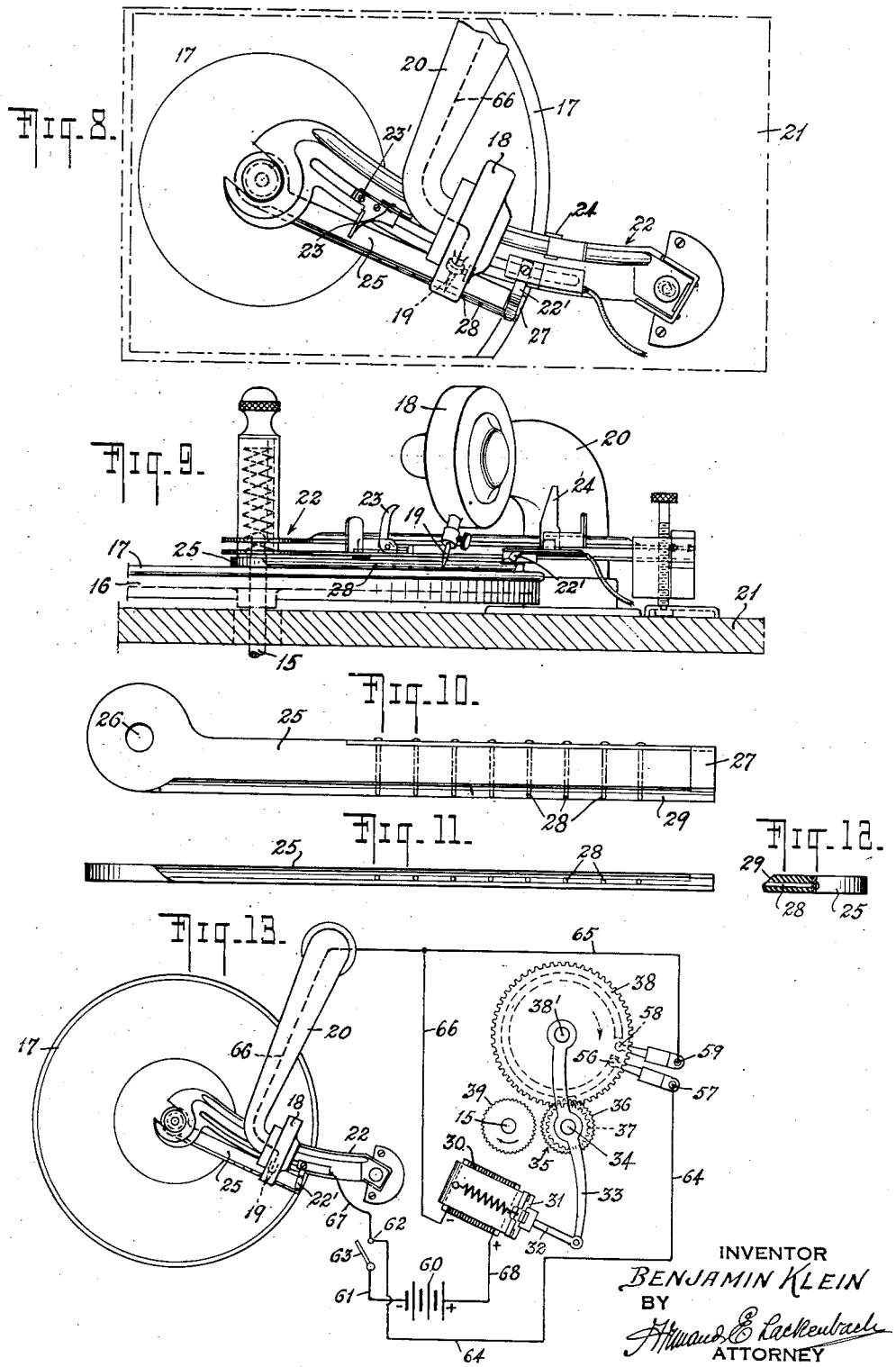
INVENTOR
BENJAMIN KLEIN
BY
ATTORNEY

UNITED STATES PATENT OFFICE 2,092,761

SOUND REPRODUCING AND DISPLAY APPARATUS

Benjamin Klein, Long Island City, N. Y.

Application November 7, 1935, Serial No. 48,645

26 Claims. (Cl. 40—28)

The invention relates to an apparatus to be used for display purposes and is designed to utilize a phonograph record in conjunction with a display of pictorial matter correlated to the subject of the material recorded upon the phonograph record. The apparatus is designed to synchronize the sections of the recorded matter on a common type of phonograph record with the display or projection of pictures, scenes, etc., of the display portion of the apparatus, or for bringing into operation extraneous devices for advertising purposes or identifying indicia, so that successive portions of recorded sound are audibly made available with illustrative or indicated matter, in sequence, and repeated upon the completion of the sound record.

The primary object of the invention is to provide mechanism by means of which the audible matter, i. e. the recorded sound, is emitted from the phonograph at the same time that a pictorial representation of the recorded subject-matter is exposed to the view of the observer, or objects, scenes, etc., are brought to the attention of such observer by the operation of mechanism controlled by the synchronized sound, the two elements being synchronized so that as one section of the recorded sound is completed with the exposure, to view, of its corresponding illustrative matter, the operation of indicative mechanism is attained and another section is begun, a pictorial representation of the second section of the recorded sound, or a different indicative mechanism is automatically brought into position by the apparatus.

I am aware that the broad idea of a combined phonograph and illustrating device, and more particularly an arrangement for successively displaying a series of pictures illustrating the subject-matter of a phonograph record as it is being repeated or transmitted to the listener is known to the art and described in the patent literature.

My present invention, however, provides a novel means including compact and inexpensive apparatus automatic and continuous in operation, without the necessity of periodic (each time the record is changed) adjustment of its elements, and which permits an arbitrary division of the recorded material into sections, for effecting such broad purpose, as well as others not attainable by prior art structures. In accordance with my invention, I make use of a novel means for synchronizing the recorded sound with the pictorial representation thereof or with mechanism brought into operation thereby, which consists, broadly speaking, in the provision of an element comprising a partly insulated piece of metal placed upon the phonograph record to cause electrical contact by the needle as it traverses portions of the phonograph record, thereby causing operation of mechanism moving the display elements a step each time a portion or section of the record has been played. In other words, the apparatus of the present invention is capable of utilization of any of its component features, namely sound, pictorial or actual display of articles, or control of electrically operable elements, either singly or in combination.

Among other objects of the invention are the provision of a novel arrangement of the mechanism carrying the display elements and the mounting of such mechanism in conjunction with the phonograph in such manner as to present a compact, easily transportable, apparatus which is inexpensive to produce and is capable of being maintained in working condition with a minimum of attention, effort and expense.

Other objects of the invention will be apparent to those skilled in the art from the following description of a particular embodiment of the apparatus to which my inventive concept has been applied and which apparatus is illustrated in the accompanying drawings, in which Fig. 1 is a perspective view of the complete display apparatus constructed in accordance with my invention;

Fig. 2 is a plan view of such apparatus with the cover member thereof removed;

Fig. 3 is an enlarged sectional view of a portion of my apparatus taken on the line 3—3 of Fig. 2;

Fig. 6 is a section on the line 6—6 of Fig. 3;

Fig. 7 is a plan view of the bottom portion of the mechanism illustrated in Fig. 6 as viewed from the line 7—7 of Fig. 6;

Fig. 8 is a detail view, on an enlarged scale, of the repeater mechanism, phonograph sound box and needle, and the associated synchronizing element;

Fig. 9 is a front elevation of the parts shown in Fig. 8;

Fig. 10 is a plan view of the synchronizing element;

Fig. 11 is a side elevation thereof;

Fig. 12 is an end view, in section, of the synchronizing element;

Fig. 13 is a wiring diagram showing the circuits between the mechanism shown in Fig. 8 and the display actuating mechanism.

Figure 5:
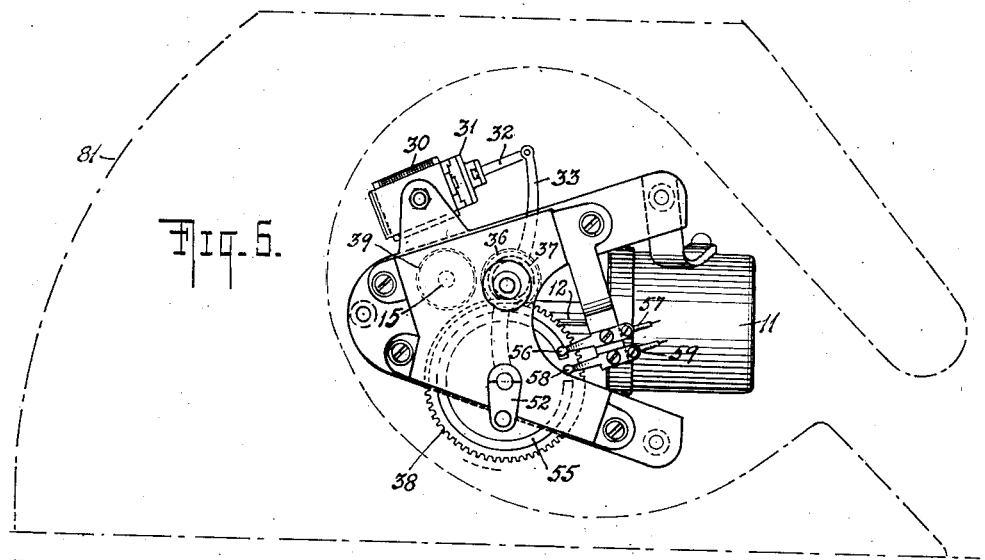
Fig. 5 is a bottom view of the mechanism illustrated in Fig. 4.
Figure 4:
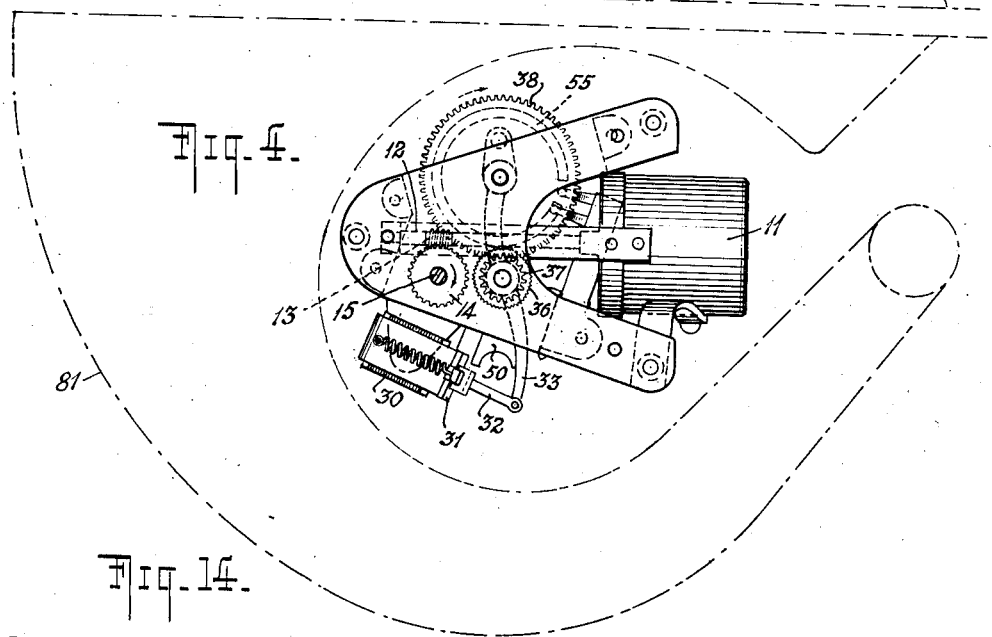
Fig. 4 is a plan view of a portion of the apparatus on the line 4—4 of Fig. 3 as viewed below the plate supporting the turntable of the phonograph mechanism.

Referring more particularly to the drawings, in which similar reference characters identify similar parts in the several views, 11 is an electric phonograph motor of the usual construction, at the end of shaft 12 of which is provided a worm 13 meshing with a gear 14. The gear 14 is secured to a shaft 15 extending upwardly and constituting the shaft extending through the turntable 16, upon which is positioned the record 17 carrying the sound subject-matter. The phonograph mechanism is of the usual construction having the sound box 18 into which is inserted the needle 19. The sound box 18 is mounted at the end of the arm 20 from whence the sound is conducted to the amplifying mechanism. The entire phonograph mechanism is supported upon a plate 21 to which is secured the frame structure carrying the motor and the mechanical synchronizing elements hereinafter to be described.

Superimposed upon the turntable is a repeater mechanism 22 of well-known construction for shifting the reproducer from the end of the record upon completion of the reproduction to the starting point upon the record. This repeater mechanism is provided with a trip lever 23 against which the sound box is adapted to strike upon completion of the reproduction of the sound effects of the record and a trip lever 24 adapted to be struck by the sound box when the latter slides back upon the repeater arm to the starting point of the record. 23' is a set screw holding the trip lever 23 in position upon the repeater arm. Upon the surface of the repeater 22 is secured a brush 22' in such position that it will contact the metal band of the die or synchronizing element hereinafter described.

Figs. 8 and 9 show the repeater in detail. This device was chosen from among those on the market, but any other repeater, that raises the tone arm and needle up off the record, upon completion of playing the record, and returns it to the starting line of the record, may be used.

As illustrated, one end of the repeater is screwed firmly to the base board of the phonograph. The other tubular end is forced over the end of the shaft 15 which passes through the turntable. It is held rigid with the shaft 15 by means of two spring claws which are constructed integral with a cylindrical bar which will be described later and which is within the tubular end. There is a long vertical set screw at the end of the repeater which passes through a horizontal U shaped member with which its threads engage and it is pivotally connected to a base piece fastened to the base board. This set screw is for adjusting the repeater mechanism to the proper height which is just a little above the top of the synchronizing element 25, and a little below the sound box 18 when the needle is on the record. The body, or horizontal part of the repeater, consists of two sections. One end of both of these sections is connected by a hinge joint into the horizontal U shaped member riding on the long set screw which turns in a vertical position on the horizontal metal plate that is fastened rigidly to the base board. The other ends of these two sections pass around the tubular form that slips over the shaft 15. The lower section is rigidly connected to the bottom of said tube. The tube has a slot in its wall as shown in Fig. 9. The upper horizontal section of the repeater is "forked" around the tube and is not connected to the tube. One side of the fork adjacent to the vertical tube carries a lug or pin which extends through the slot in the vertical tube. Inside the vertical tube pivotally connected to its top inside surface but not touching the inside wall of the tube is a cylindrical bar with a spiral channel cut around its surface. The channel starts near the bottom, spirals upward to almost the top end of the bar, and forms a continuous spiral down to almost the bottom of the bar. The upward and downward spirals cross each other as shown in Fig. 8. The bottom of this bar is split to form two claws that serve to grip the shaft 15. The pin carried by the upper horizontal part of the repeater rides freely in this channel and in its lowest position drops free of the channel. The lower horizontal section of the repeater has on it the trip lever 23 of L shape, which is constructed so that it can be set at any point along the section. The vertical part is shown clearly in Fig. 9. The horizontal part extends under the upper horizontal section of the repeater as can be seen in Fig. 8. This trip lever pivots from the corner of the L as can be seen in Fig. 9. The upper horizontal section of the repeater carries a stop which is so constructed that it can be set at any point along the section. As applied to my device, the repeater would be used and would operate in the following manner:

A record is placed on the turntable and the synchronizing element is set over the same shaft that the record has been placed over. The tubular end of the repeater is placed over the same shaft but a small space would be left between it and the synchronizing element so that the synchronizing element could revolve freely with the record. The needle and tone arm is set on the starting point of the record. The stop 24 is set against the sound box 18. The needle and sound box are set on the last line of the record, and the trip lever 23 is set against the wall of the sound box. In its normal position, the repeater appears as in Figs. 8 and 9.

The tone arm would now be lifted up off the repeater and the trip lever would be manually tripped in the direction toward the shaft 15. This tripping action causes the upper horizontal section of the repeater to rise slightly and thus place the pin into the spiral channel. The bar with this channel on it is continuously revolving with the shaft 15, and therefore when the pin engages said channel, the entire upper horizontal section of the repeater will rise. While this section is in the raised position the tone arm is set on it near the tubular end. Inasmuch as this end is now raised much higher than the other end, the tone arm will slide downhill until it strikes the stop 24. This sliding action takes less time than it takes for the pin to ride down the channel so that as the upper section of the repeater is lowered, it sets the tone arm and needle on the first line of the record. This section of the repeater drops a little lower than it has to travel to set the needle on the record. When the pin reaches the bottom of the channel it drops out of it. The vertical bar continues to revolve with the shaft 15 all the time that the record is playing. When the tone arm and needle works in the grooves of the record to a point where it exerts pressure against the trip lever in the direction of shaft 15, it will trip said lever which will raise the upper horizontal section of the repeater slightly and thus cause its pin to ride upward in the spiral channel. The upper horizontal section will raise the tone arm with it and the tone arm will slide down-hill, repeating the operation just described.

The synchronizing element effective to synchronize the movement of the display device with the sections of the phonograph record to which it is correlated comprises a strip of fibre which, for the lack of a better descriptive term, I shall hereinafter call a "die". This die 25 is in the form of an elongated strip having at one end an aperture 26 of a size corresponding with the diameter of the shaft 15 extending through the turntable 16 so that the die may be positioned upon the phonograph record 17 by means of such aperture.

The die at the end thereof opposite the aperture 26 is provided with a metal band 27, such metal band extending along one edge of the die. On the opposite edge of the die, from that along which the metal band 27 extends, there are provided a plurality of contact points 28 for the purpose hereinafter to be more fully described. Such contact points extend through the die 25 to the opposite edge thereof where they come into contact with the metal band 27. The edge of the die 25 provided with the contact points 28 is chamfered as shown at 29.

Coming now to a description of the mechanism for effecting the periodic movement of the display device carrying the pictorial representation of the sound subject, 30 is an electromagnet which is effective to attract, when energized, an armature 31 secured to the end of a lever 32 pivotally secured at its other end to a lever 33, the latter being pivoted also at 38', the center 34 of such lever serving as a bearing for a gear 35 having two sections 36 and 37. The first section 36 of the gear 35 is a ratchet gear section, the second section 37 of such gear being a regular gear section. A fibre gear 38 of a diameter approximately five times the diameter of the gear section 37 is in mesh with such gear section. The ratchet gear section 36 of the gear 35 is adapted, when the mechanism is brought into operative position, to mesh with a ratchet gear 39 secured upon the shaft 15 receiving its motive power from the motor 11 through the shaft 12 and worm 13.

The gear 39, rotating continuously by reason of its securement upon the shaft 15, rotated by the phonograph motor, is periodically engaged by the ratchet gear 36 for the purpose hereinafter to be described. When thus engaged by such gear 36, the fibre gear 38 is rotated operating its associated mechanism.

The device upon which the pictorial representations of the sound subject are mounted comprises an octagonal drum 40 integral with, and mounted for rotation upon, the shaft 41, the drum having a hub 42 from which extend in the particular embodiment illustrated eight spokes 43 to the eight faces 44 of the drum. The faces of the drum are provided with channels or other securing means 45 for holding the pictures upon the drum faces. Within the hub 42 and upon which such hub is mounted is a shaft 41 and attached thereto is a metal cylinder 47 into which is set a brush 48. The lower portion of shaft 41 is insulated from cylinder 47 by material 46. Immediately above the spokes 43 and secured to the hub 42 is a Geneva gear 50 which is adapted to be driven by roller 51 mounted at the end of a pawl 52 having a locking portion 53.

Set into the face of gear 38 is a broken metal ring 55 which is adapted to be contacted by contact point 56 of a terminal 57 and in another position thereof also by contact point 58 of a terminal 59. The source of power 60 may comprise a series of batteries or a transformer delivering low voltage. From such source of power a wire 61 connects its negative terminal to a switch 63, the negative current being carried by wire 64 from terminal 62 of the switch 63 to terminal 57. Wire 65 joins with wire 66 and thereby carries negative current from the terminal 59 to the negative terminal of the magnet 30. From the negative terminal of the magnet 30, a wire 66 conducts the current to the phonograph needle 19 through the tone arm 20. From the switch terminal 62 the negative current is carried to the brush 22' by wire 67.

The positive current from the source of power 60 is carried by wire 68 to the positive terminal of the magnet 30.

When the needle 19 is in contact with one of the points 28 of the die, the circuit is traced as follows: Negative terminal of power source 60, switch 63, terminal 62, through wire 64 to the terminal 57, in contact with the extremity of the broken metal ring 55. The current also travels through wire 67, brush 22', contact point 28, needle 19, wire 66, the current thence going to magnet 30 and also to terminal 59 which until now was out of contact with broken metal ring 55. The broken metal ring thus forms a portion of the negative circuit.

The entire apparatus just described is enclosed in a case 75 having a hinged grilled lid. The case 75 has an open face 76 through which the pictures are displayed, such open face being capable of closure by a metal sheet 78 when the device is to be transported. A sheet of glass 78' or other transparent material is in position upon the open face 76 in place of the metal sheet 78 when the display apparatus is in operation. The case is supported by four spokes 79 extending from a hub 80 to four of the eight faces of the case 75. The four spokes 79 also form the support by means of brackets, for the plate 21 of the phonograph mechanism. 81 is the tone chamber of the phonograph mechanism attached to plate 21 supporting the mechanism and upon which the tone arm and associated parts are mounted.

Below the hub 42, circumscribing the metal cylinder 47, the latter being secured to the shaft of such hub, and mounted upon the hub 80, is a fibre ring 69 through which extend at equal distances along its circumference, eight conductors 70, each adapted to be contacted, upon revolution of the metal cylinder 47, by the brush 48 carried thereby. Secured upon the top of the fibre ring 69, at one point along its circumference, a conductor 71 carrying brush 72 at the end thereof, contacts the metal cylinder 47.

Figure 14:
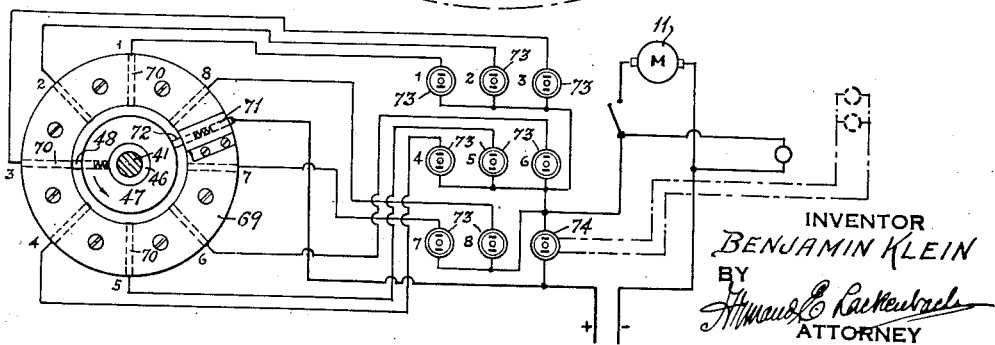
Fig. 14 is a wiring diagram showing the circuits between the conductors successively engaged upon operation of the apparatus and the outlets for conducting current to extraneous devices.

As will be seen from the wiring diagram of Fig. 14, each of the conductors 70 is in circuit with an outlet 73, eight of such outlets being shown, corresponding with the eight conductors provided on the fibre ring 69. The input 74 is the main source of power providing current for the outlets 73 as they are, in turn, brought into the circuit and also to the parts of the apparatus operating on 110 volts.

The operation of my novel display apparatus for the synchronous emission of recorded sound and display of pictorial matter, etc. is as follows: With a phonograph disc having, in the illustrated embodiment eight sound effect sections, in position upon the turntable of the phonograph mechanism, and the sound box in inoperative position, the switch for starting the motor running is operated so as to set the record revolving. The switch 63 is operated to close the negative circuit from 60 to 22' and to 57. The die 25 will revolve freely with the record 17 and will pass under the repeater 22 each time the die passes such repeater. Upon tripping the lever 23, the free end of the repeater rises, the sound box 18 being positioned upon it. The sound box will slide along the repeater as far as the trip lever 24 and will be placed by the repeater, returning to its normal position, upon the starting line of the record. Upon the next revolution of the record the needle 19 will engage the edge of the die 25 provided with the contact points 28 and will prevent such die from revolving while the record 17 continues to revolve and by friction pulls die 25 against needle 19. In this stationary position of the die, the brush 22' will contact with the metal band 27 while the needle 19 is permitted to slide along the fibre portion of the die 25 between the metal band 27 and the first of the contact points 28.

As the record is being played, the needle 19 will slide along the die 25 toward the center of the record. When the needle reaches the first of the contact points 28 an electrical circuit will be completed from the negative terminal of the source of power 60 to the negative terminal of the magnet 30 and from the positive terminal of the source of power to the positive terminal of the magnet. The armature 31 will therefore, by reason of the energizing of the magnet, be drawn toward such magnet. The levers 32 and 33 will therefore draw the ratchet gear 36 into engagement with ratchet gear 39 which is revolving continuously at the same rate of speed as the record 17. The second section 37 of the gear 35 is always in mesh with the fibre gear 38, and, being one-fifth the diameter of such fibre gear, will make five revolutions for each revolution of the fibre gear 38.

By the time the needle 19 has passed the first contact point 28, the circuit running through the die 25 will be broken, but the fibre gear 38 will have moved a sufficient distance for contact points 56 and 58 both to be riding upon the broken metal ring 55, thus establishing a circuit similar to the one just broken. This new circuit starts at the negative terminal of the source of power 60 and passes through wire 61, switch 63, terminal 62, wire 64, terminal 57, contact point 56, broken ring 55, contact point 58, terminal 59, wire 65, wire 66, to the negative terminal of magnet 30 and from the positive terminal of such source of power to the positive terminal of said magnet. This circuit will continue until the gear 38 has made one complete revolution, at which time the circuit will be broken as the opening in the metal ring 55 passes over the contact point 58. The pawl 52 has now made one revolution and in so doing the roller 51 has driven the Geneva gear 50 one-eighth of a revolution and the Geneva gear has been locked in position by the locking portion 53. As the hub supporting the octagonal drum, the spokes extending from said hub and the drum are fastened to the Geneva gear, the drum has been revolved one-eighth its circumference, thereby exposing the second of the series of pictures through the open face 76 of the display structure.

As the record continues to revolve, the just described series of steps will be repeated until the needle 19 passes the last of the contact points 28 when the sound box 18 will trip the lever 24, causing the repeater 22 to rise and slide the sound box 18 and the needle 19 back to the starting line of the record. While the sound box is sliding back to the starting line, the die 25 will revolve freely with the record until the needle is set back upon the record.

For synchronizing the playing of sections of the record with bringing into operation extraneous devices for advertising purposes, or for identifying objects, pictures, scenes, etc., by spotlight, illumination, or pointers, the portion of the apparatus including the metal ring 47, fibre ring 69, and associated parts, illustrated in the wiring diagram 14, are utilized, as follows:

The metal ring 47 revolves with its shaft 41 in a manner similar to the rotation with the same shaft, of the Geneva gear 50, being controlled by the phonograph mechanism as hereinabove described. The brush 72, being always in contact with the metal ring 47, constitutes one end of the circuit, through conductor 71, from the main input 74. As the metal ring 47 rotates, it will successively bring its brush 48 into contact with one of the conductors 70 embedded in the fibre ring 69, and secure the parts in locked position as heretofore described with reference to the operation of the Geneva gear, thereby completing the circuit from the brush 72, through the metal ring 47, brush 48, one of the conductors 70, to the outlet 73 connected to the particular conductor 70 contacted. Any mechanism operating by electric current from the outlet 73 will therefore be brought into operation. It will be obvious to those skilled in the art that electrical impulses of sufficient strength for general use, synchronized with recorded sound, as above described, may be conducted from outlets 73, in sequence, by means of ordinary electric plugs, and carried by wires to any desired point.

In order to enlarge the pictures carried by the drum 40, and project them onto a viewing screen or billboard, the projector 84, shown in dotted outline in Fig. 2, may be utilized. This projector may be of any well-known construction, in the particular embodiment illustrated, by reason of the use of plain pictures, it taking the form of a stereopticon projector having light bulbs by means of which the picture is projected by reflection. However, when using a negative film, the projector may obviously be of the type projecting the negative picture by the transmission of light therethrough.

The apparatus hereinabove described may be used in conjunction with a turntable that will start and stop as the change of sound takes place. In order to adapt the apparatus to this type of operation, it is only necessary to construct a turntable with the same mechanical arrangement as is used to drive the above described apparatus. Each electrical impulse that is delivered from the device will cause the same fractional turn to take place in the mechanical arrangement driving the turntable. The electrical impulses delivered to the turntable would act upon it in the same manner as the intermittent impulses delivered by means of the die 25 effect the present apparatus. It is also obvious that the turntable may be of any size and power and may be located at any distance from the actuating mechanism.

Illustrations of the above application, as well as of others that will occur to those operating the apparatus of the present invention are believed to be unnecessary as the rigging up of the necessary associated parts is within the skill of the ordinary mechanic. Thus, the impulse delivered by the apparatus described may be delivered to a magnet which in turn will draw to it an armature to which a pointer is attached. By using several such magnets, the pointers may be used to indicate objects referred to or described by the recorded sound. Obviously, combination display effects of sound, spotlight, pointers, and turntable device, or any combination of any or all of these at one time, synchronized, can be accomplished by the use of the apparatus of the present invention.

It is to be noted in connection with the apparatus hereinbefore described that in view of the fact that the ordinary phonograph record as recorded, does not constitute a series of concentric straight lines, but rather, a series of lateral waves of varying length, and also by reason of the warpage of the record and the necessary loose pivoting of the tone arm, when the phonograph needle comes into juxtaposition with the series of contact points 28 upon the synchronizing element or "die", there is produced a series of short contacts, instead of one short but sustained contact. In other words, the needle, in contacting the die at any particular uninsulated portion thereof, will first touch the contact point, then recede from the contact, again make the contact for an interval, probably pass the contact point momentarily, then return to the contact point, and finally leave the contact point permanently.

In the apparatus described, I have made provision for this inherent limitation as follows: The broken ring 55, in conjunction with the contact points 56 and 58, converts the first slight contact into a sustained contact for the period of time that it takes gear 38 to make one complete revolution. Because gear 39 rotates at the same rate of speed as the record 17 and it drives gear 36, which, in turn is integral with gear 37, and because the ratio of gear 38 to gear 37 is five to one, the sustained contact will last for a period of time that it takes the record 17 to make five revolutions. The contact points 28 on the synchronizing element each occupy a space equal to two lines or revolutions of the record, so that the intermittent contacts caused by the needle 19 against any contact point on the synchronizing element will be over by the time the sustained contact on ring 55 ends. Thus, the revolution of the drum 40 is uniform and periodically controlled.

While I have described a particular embodiment of my invention, it is obvious that various changes therein, in the correlation, form, and arrangement of the several parts thereof may be made without departing from the invention. Thus, while the invention has been described and illustrated as embodied in an apparatus having eight sections of recorded sound, correlated pictorial matter, and electrical impulse outlets, it is obvious that apparatus along identical or similar lines, with only immaterial changes in design, may be constructed for carrying out the invention with a larger or smaller number of such sections and devices. Similarly, while the synchronizing element or die 25 is described and illustrated constituted of a strip of fibre having one edge lined with a metal band and having metallic conductors embedded therein, it is obvious that the same results can be accomplished by constructing the strip 25 of metal, insulated substantially throughout its surface, as for instance with a coating of lacquer, the coating of lacquer being removed at the points selected for the contact points 28 and at a point at which the brush carried on the repeater may make contact with said strip. The metal bar or strip will then constitute the conductor with the circuit established therethrough by means of the uninsulated points.

Various other changes will occur to those skilled in the art and I therefore desire to be limited only by the ambit of the appended claims.

I claim:

1. Apparatus for the display of a plurality of subjects relevant to sound recorded upon a phonograph record, simultaneously with the rendition of such sound, and synchronized as to the display with respect to the various portions of the record to which the various displayed subjects relate, comprising, in combination, a phonograph record, mechanism for imparting rotation to said record, a phonograph needle, a synchronizing element having a plurality of contact points insulated from each other, electrical connections to the needle, electrical connections to the contact points of the synchronizing element, and mechanism operable upon completion of the circuit between the needle and any of said contact points for moving a structure carrying the display elements a step each time a portion of the record has been played.

2. Apparatus for the display of a plurality of subjects relevant to sound recorded upon a phonograph record, simultaneously with the rendition of such sound, and synchronized as to the display with respect to the various portions of the record to which the various displayed subjects relate, comprising in combination, a phonograph record, mechanism for imparting rotation to said record, a phonograph needle, a synchronizing element having a plurality of contact points insulated from each other, electrical connections to the needle, electrical connections to the contact points of the synchronizing element, and mechanism operable upon completion of the circuit between the needle and any of the contact points for energizing a circuit serving to bring into operation devices identifying the subject displayed in conjunction with the recorded sound.

3. Apparatus for the display of a plurality of subjects relevant to sound recorded upon a phonograph record, simultaneously with the rendition of such sound, and synchronized as to the display with respect to the various portions of the record to which the various displayed subjects relate, comprising, in combination, a phonograph record, mechanism for imparting rotation to said record, a phonograph needle, a synchronizing element having a plurality of contact points insulated from each other, electrical connections to the needle, electrical connections to the contact points of the synchronizing element, mechanism carrying a plurality of display elements, means for operating said mechanism upon completion of the circuit between needle and any of said contact points thereby moving the same a step each time a portion of the record has been played, and means for energizing a circuit, upon completion of the circuit between the needle and any of said contact points, serving to bring into operation devices identifying the subject displayed in conjunction with the recorded sound.

4. Apparatus as claimed in claim 1 in which the synchronizing element comprises an insulated bar of metal having an aperture at one end for positioning upon the shaft of the record rotating mechanism so as to permit the revolution of said element with said record.

5. Apparatus as claimed in claim 1 in which the synchronizing element comprises a strip of insulating material having an aperture near one end for positioning the strip upon the record, a metal band running substantially the length of one edge of the strip, and a plurality of conductor wires embedded in said strip and contacting said metal band.

6. Apparatus as claimed in claim 2 in which the synchronizing element comprises an insulated bar of metal having an aperture at one end for positioning the bar upon the record, so as to permit the revolution of said bar with said record.

7. Apparatus as claimed in claim 2 in which the synchronizing element comprises a strip of insulating material having an aperture near one end for positioning the strip upon the record, a metal band running substantially the length of one edge of the strip, and a plurality of conductor wires embedded in said strip and contacting said metal band.

8. Apparatus as claimed in claim 1 in which the mechanism operable upon completion of the circuit between the needle and any of the contact points on the synchronizing element includes a source of power, an electro-magnet having an armature, a gear train, and a Geneva gear mounted for rotation by said gear train, the display structure being mounted for rotation with said Geneva gear.

9. Apparatus as claimed in claim 1 in which the mechanism operable upon completion of the circuit between the needle and any of the contact points on the synchronizing element includes a source of power, an electro-magnet having an armature, a gear having two sections, a master gear continuously in mesh with one of the sections of said gear, a second gear adapted to be engaged by the second section of said first mentioned gear, a Geneva gear mounted for rotation with said first mentioned gear, the display structure being mounted for rotation with said Geneva gear.

10. Apparatus as claimed in claim 1 in which the mechanism operable upon completion of the circuit between the needle and any of the contact points on the synchronizing element includes a source of power, an electromagnet having an armature, a gear train, a Geneva gear mounted for rotation by said gear train, and means for locking said Geneva gear in position, said means comprising a roller and a pawl adapted to bring said roller into engagement with one of the arcuate recesses of the Geneva gear when the mechanism is in operative position.

11. Apparatus as claimed in claim 2 in which the mechanism operable upon completion of the circuit between the needle and any of the contact points on the synchronizing element comprises a metal ring, a ring formed of an insulating material surrounding said metal ring and having a plurality of conductor wires embedded therein, a contact brush continuously in contact with said metal ring, a source of power supplying current to said brush, a second brush secured within said metal ring and extending therefrom for contact of said conductor wires individually during the rotation of said metal ring, and electrical outlets connected to said conductor wires.

12. In a sound reproducing and display apparatus, including a phonograph record, a needle, and a repeater mechanism, a synchronizing element comprising an elongated strip, means for contacting one terminal of an electric circuit with said strip, insulation substantially throughout the entire surface of said strip except at a plurality of points along one edge thereof, the phonograph needle, constituting the other terminal of said circuit, being adapted to pass along such edge, during revolution of the record, and successively contact said uninsulated points in the strip, thus making said strip a part of said circuit.

13. In a sound reproducing and display apparatus, including a phonograph record, and a needle, a synchronizing element comprising a bar having a plurality of contact points insulated from the body of the bar, and means for completing an electric circuit, through the needle, each time the needle comes into contact with one of said contact points.

14. In a sound reproducing and display apparatus, including a phonograph record, a needle, and a repeater mechanism, a synchronizing element comprising a bar mounted for rotation with the record and having a plurality of contact points insulated from the body of the bar, and means for completing an electric circuit, through the needle, each time the needle comes into contact with one of said contact points.

15. In a sound reproducing and display apparatus, including a phonograph record and a needle, a synchronizing element comprising a strip of insulating material having an aperture near one end for positioning the strip upon the phonograph record for rotation therewith, a metal band running substantially the length of one edge of the strip, and a plurality of conductor wires embedded in said strip and contacting said metal band.

16. A synchronizing element as claimed in claim 15 in which the metal band continues around the end of the strip opposite that having the aperture.

17. Apparatus for the display of a plurality of subjects relevant to sound recorded upon a phonograph record, simultaneously with the rendition of such sound, and synchronized as to the display with respect to the various portions of the record to which the various displayed subjects relate, comprising, in combination, a phonograph record, mechanism for imparting rotation to said record, a tone arm, a phonograph needle, a synchronizing element having a plurality of contact points insulated from each other, an electrical connection to the tone arm, electrical connections to the contact points of the synchronizing element, and mechanism operable upon completion of the circuit between the tone arm and any of said contact points for moving a structure carrying the display elements a step each time a portion of the record has been played.

18. Apparatus for the display of a plurality of subjects relevant to sound recorded upon a phonograph record, simultaneously with the rendition of such sound, and synchronized as to the display with respect to the various portions of the record to which the various displayed subjects relate, comprising, in combination, a phonograph record, mechanism for imparting rotation to said record, a tone arm, a phonograph needle, a synchronizing element having a plurality of contact points insulated from each other, an electrical connection to the tone arm, electrical connections to the contact points of the synchronizing element, and mechanism operable upon completion of the circuit between the tone arm and any of the contact points for energizing a circuit serving to bring into operation devices identifying the subject displayed in conjunction with the recorded sound.

19. In a sound reproducing and display apparatus, including a phonograph record, a tone arm having an electrical contact point, and a needle, a synchronizing element comprising a bar having a plurality of contact points insulated from the body of the bar, and means for completing an electric circuit, through the tone arm, each time the contact point of said tone arm comes into contact with one of said contact points on said bar.

20. In a sound reproducing and display apparatus, including a phonograph record, a tone arm, and a repeater mechanism, an electrical contact element on said tone arm, a synchronizing element comprising a bar mounted for rotation with the record and having a plurality of contact points insulated from the body of the bar, and means for completing an electric circuit, through the tone arm and contact element, each time said contact element comes into contact with one of said contact points on said bar.

21. Apparatus for the display of a plurality of subjects relevant to sound recorded upon a phonograph record, simultaneously with the rendition of such sound, and synchronized as to the display with respect to the various portions of the record to which the various displayed subjects relate, comprising, in combination, a phonograph record, mechanism for imparting rotation to said record, a phonograph needle, a synchronizing element having a plurality of contact points insulated from each other, electrical connections to the needle, electrical connections to the contact points of the synchronizing element, and mechanism operable upon completion of the circuit between the needle and any of said contact points for moving a structure carrying the display elements a step each time a portion of the record has been played, and means for closing said circuit for a predetermined period of time when the circuit through the needle and any contact point on the synchronizing element has been completed.

22. Apparatus for the display of a plurality of subjects relevant to sound recorded upon a phonograph record, simultaneously with the rendition of such sound, and synchronized as to the display with respect to the various portions of the record to which the various displayed subjects relate, comprising in combination, a phonograph record, mechanism for imparting rotation to said record, a phonograph needle, a synchronizing element having a plurality of contact points insulated from each other, electrical connections to the needle, electrical connections to the contact points of the synchronizing element, and mechanism operable upon completion of the circuit between the needle and any of the contact points for energizing a circuit serving to bring into operation devices identifying the subject displayed in conjunction with the recorded sound, and a separate delayed electrical circuit adapted to be energized by the completion of the circuit through the needle and a contact point on the synchronizing element.

23. Apparatus for the display of a plurality of subjects relevant to sound recorded upon a phonograph record, simultaneosly with the rendition of such sound, and synchronized as to the display with respect to the various portions of the record to which the various displayed subjects relate, comprising, in combination, a phonograph record, mechanism for imparting rotation to said record, a phonograph needle, a synchronizing element having a plurality of contact points insulated from each other, electrical connections to the needle, electrical connections to the contact points of the synchronizing element, mechanism carrying a plurality of display elements, means for operating said mechanism upon completion of the circuit between needle and any of said contact points thereby moving the same a step each time a portion of the record has been played, and means for energizing a circuit, upon completion of the circuit between the needle and any of said contact points, serving to bring into operation devices identifying the subject displayed in conjunction with the recorded sound, and a separate delayed electrical circuit adapted to be energized by the completion of the circuit through the needle and a contact point on the synchronizing element.

24. Apparatus for the display of a plurality of subjects relevant to sound recorded upon a phonograph record, simultaneously with the rendition of such sound, and synchronized as to the display with respect to the various portions of the record to which the various displayed subjects relate, comprising in combination, a phonograph record, mechanism for imparting rotation to said record, a phonograph needle, a synchronizing element having a plurality of contact points insulated from each other, electrical connections to the needle, electrical connections to the contact points of the synchronizing element, and mechanism operable upon completion of the circuit between the needle and any of the contact points for energizing a circuit serving to bring into operation devices identifying the subject displayed in conjunction with the recorded sound, and a separate delayed electrical circuit adapted to be energized by the completion of the circuit through the needle and a contact point on the synchronizing element, said separate delayed electrical circuit including a broken metal strip, a contact point upon said strip, and a contact point in the space between the ends of said broken metal strip.

25. Apparatus for the display of a plurality of subjects relevant to sound recorded upon a phonograph record, simultaneously with the rendition of such sound, and synchronized as to the display with respect to the various portions of the record to which the various displayed subjects relate, comprising, in combination, a phonograph record, mechanism for imparting rotation to said record, a phonograph needle, a synchronizing element having a plurality of contact points insulated from each other, an electrical terminal, a connection to said terminal, electrical connections to the contact points of the synchronizing element, and mechanism operable upon completion of the circuit between the terminal and any of said contact points for moving a structure carrying the display elements step by step each time a portion of the record has been played.

26. Apparatus for the display of a plurality of subjects relevant to sound recorded upon a phonograph record, simultaneously with the rendition of such sound, and synchronized as to the display with respect to the various portions of the record to which the various displayed subjects relate, comprising in combination, a phonograph record, mechanism for imparting rotation to said record, a phonograph needle, a synchronizing element having having a plurality of contact points insulated from each other, an electrical terminal, an electrical connection to said terminal, electrical connections to the contact points of the synchronizing element, and mechanism operable upon completion of the circuit between the terminal and any of the contact points for energizing a circuit serving to bring into operation devices identifying the subject displayed in conjunction with the recorded sound.

BENJAMIN KLEIN.